United States Patent [19]

Yamada

[11] Patent Number: 5,349,326
[45] Date of Patent: Sep. 20, 1994

[54] CAR AUDIO APPARATUS

[75] Inventor: Morito Yamada, Hamamatsu, Japan

[73] Assignee: Yamaha Corporation, Japan

[21] Appl. No.: 906,690

[22] Filed: Jun. 30, 1992

[30] Foreign Application Priority Data

Jul. 3, 1991 [JP] Japan .................................. 3-163117

[51] Int. Cl.⁵ ........................ B60R 25/10; G08B 13/14
[52] U.S. Cl. ..................................... 340/426; 340/543;
340/568; 340/825.34; 455/346; 455/348
[58] Field of Search ................ 340/426, 542, 543, 568,
340/571, 572, 825.3, 825.31, 825.32, 825.5,
825.34; 455/346, 345, 347, 348

[56] References Cited
U.S. PATENT DOCUMENTS

| | | | |
|---|---|---|---|
| 4,542,372 | 9/1985 | Takach, Jr. ............................ | 340/500 |
| 4,683,462 | 7/1987 | Takeda et al. ................... | 340/825.32 |
| 4,720,700 | 1/1988 | Seibold et al. .................. | 340/825.32 |
| 4,755,799 | 7/1988 | Romano ................................ | 340/543 |
| 5,093,862 | 3/1992 | Scwartz ........................... | 340/825.31 |

Primary Examiner—Donnie L. Crosland
Attorney, Agent, or Firm—Graham & James

[57] ABSTRACT

A car audio apparatus mounted on an automobile and having a function for preventing theft, the car audio apparatus includes a main body portion fixed to the automobile and a front panel detachably mounted to the main body portion of the audio apparatus. The main body portion has a CPU and a first memory for storing a first secret code and the front panel has a second memory for storing a second secret code. The CPU is capable of respectively reading out the first and second secret codes from the first and second memories and comparing the first secret code with the second secret code so that when both secret codes agree, the CPU enables operation of the car audio apparatus and when both of the secret codes do not agree, the CPU inhibits the operation of the car audio apparatus.

3 Claims, 3 Drawing Sheets

CAR AUDIO APPARATUS

FIELD OF THE INVENTION

The present invention relates to a car audio apparatus having improved antitheft means.

BACKGROUND OF THE INVENTION

Theft of audio apparatuses mounted on automobiles (hereinafter a car audio apparatus) has become an increasingly serious problem. Therefore, there is a demand for effective antitheft means. Antitheft means presently adopted are classified into three major categories:

(1) A car audio apparatus has a handle and is detachably mounted on an automobile. When a driver (owner) does not use the car audio apparatus in the automobile and gets out of the automobile, he or she can take the audio apparatus out of the automobile by pulling the handle.

(2) A front panel having various operation keys and a display portion is designed to be capable of separating from a main body portion of a car audio apparatus. When the audio apparatus is not used, only the front panel is taken out of the automobile.

(3) A password, or a unique code, has been previously registered in a car audio apparatus. When a driver gets into the automobile and tries to use the car audio apparatus, he or she must enter a correct code, which is the same as the registered password or unique code, into the car audio apparatus. The use of the car audio apparatus is not allowed unless the entered code agrees with the previously registered code.

With the system (1) described above, the whole car audio apparatus must be taken out. Since the whole car audio apparatus is heavy and bulky, it is inconvenient to carry the car audio apparatus.

With the system (2), if a thief who stole the main body portion of the audio apparatus buys only a front panel of the same type later, then the main body portion of the audio apparatus will be usable with the front panel. Consequently, this system is not perfect as an antitheft means.

With the system (3), whenever the owner gets into the automobile, he or she must enter the unique code. Hence, this is troublesome.

SUMMARY OF THE INVENTION

It is an object of the present invention to provide a car audio apparatus which is free of the foregoing problems. That is, the owner is not required to carry the heavy audio apparatus. The user is not required to enter the correct code whenever the audio apparatus is used. Also, the use of the audio set is not allowed if the thief buys only a front panel of the same construction.

The above object is achieved by a car audio apparatus comprising, a main body portion fixed to the automobile, the main body portion having a first storage means for storing a first secret code, a front panel detachably mounted to the main body portion of the audio apparatus, the front panel having a second storage means for storing a second secret code, and a control means for respectively reading out the first and second secret codes from the first storage means and second storage means and comparing the first secret code with the second secret code so that when both secret codes agree, the control means enables the operation of the car audio apparatus and when both of the secret codes do not agree, the CPU inhibits the operation of the car audio apparatus.

According to the car audio apparatus, the first and second storage means store their respective secret codes. These codes are compared to automatically determine whether the operation of this audio apparatus should be allowed.

Other objects and features of the invention will appear in the course of the description thereof which follows.

DETAILED DESCRIPTION OF THE INVENTION

Figure 1:
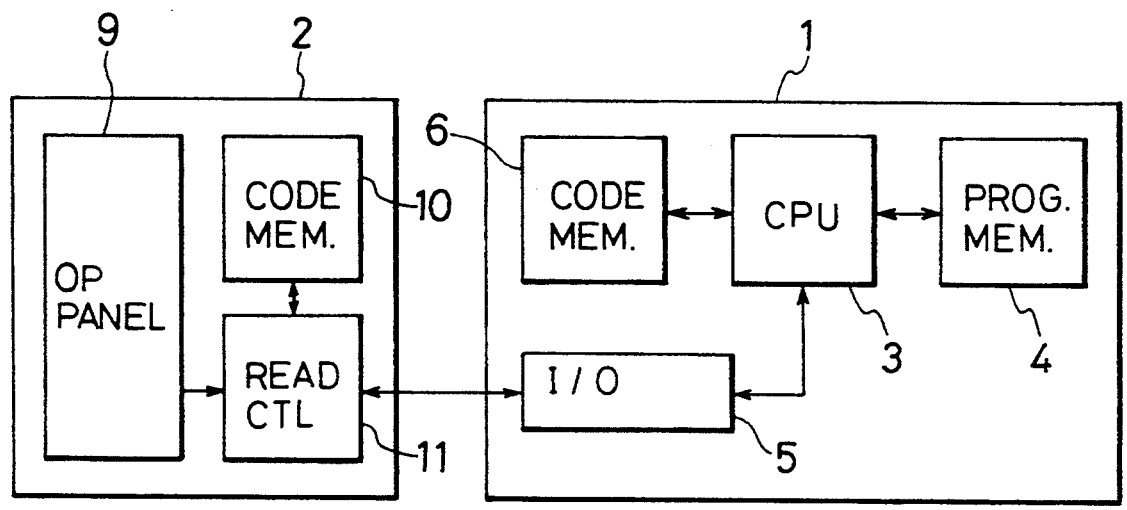
FIG. 1 is a block diagram of a car audio apparatus according to the invention.

Referring to FIG. 1, there is shown the block diagram of the car audio apparatus according to the invention. A main body portion of this audio apparatus is generally indicated by reference numeral 1. A front panel 2 that constitutes a control panel is detachably mounted to the main body portion 1. The main body portion 1 of the audio apparatus includes electrical circuits such as a power amplifier (not shown) similar to that of ordinary car audio apparatuses. The main body portion 1 further includes a central processing unit (CPU) 3 controlling various portions of the audio apparatus, a program memory 4, an I/O interface 5, and a memory 6 in which a secret code is stored. The memory 6 consists of an electrically erasable programmable read only memory (EEPROM) that is nonvolatile and can be reprogrammed. The front panel 2 has an operation portion 9 operated by the user, a memory 10 storing a secret code therein, and a reading control portion 11 for reading out the secret code from the memory 10. The memory 10 consists of an EEPROM in the same way as the memory 6. The car audio apparatus of the invention is so designed that the secret code can be changed to any desired code by the owner of the audio apparatus. When the front panel 2 is mounted to the main body portion 1, the reading control portion 11 can be electrically connected with the main body portion 1 through the I/O interface 5.

The storing means of the secret code may not be limited to the above example. For example, the secret code for both the main body portion 1 and front panel 2 also may be respectively written to the memories 6 and 10 in a factory in which the car audio apparatus is manufactured and from which the manufactured audio apparatus will be transported. In this case, the secret code, however, is intrinsic to each audio apparatus.

Figure 2:
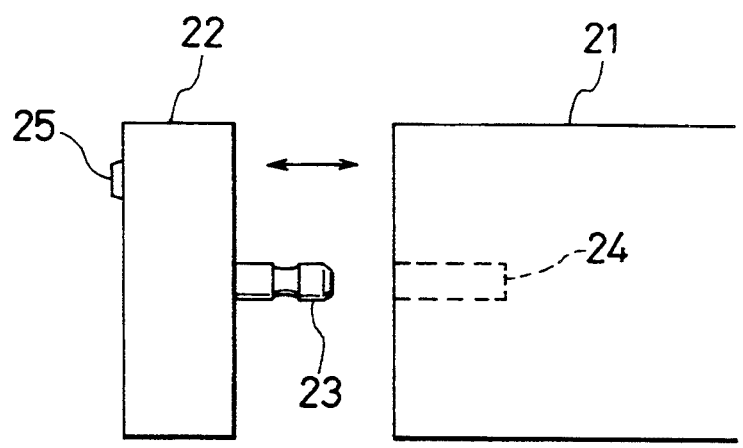
FIG. 2 is a side-view of a part of the car audio apparatus according to the invention.

The front panel 2 is detached from the main body portion 1 in the manner described below. FIG. 2 is a side-view of a part of the car audio apparatus of the invention, for illustrating attachment and detachment of the front panel. The front panel is indicated by numeral 22 in this figure and has a panel support portion 23 protruding from the rear side of the front panel 22. A lock mechanism 24 (indicated by the broken line since it cannot be seen in this side elevation) which fits into the panel support portion 23 is mounted on the front side of the main body portion, indicated by 21 in this figure. When the front panel 22 is to be detached from the main body portion 21, a front panel ejection button 25 installed on the front surface of the panel is depressed. Then, an electrical signal indicating unlocking is sent to the main body portion 21 of the car audio apparatus via I/O interface, e.g., by means of the panel support portion 23 and lock mechanism 24. The lock mechanism 24 comes out of engagement with the panel support portion 23. Under this condition, the front panel is supported only by the support 23 fitted in the main body portion. The operator then pulls out the front panel 22 by moving it to the left as viewed in this figure. In this way, the front panel can be easily detached from the main body portion. When the user desires to mount the front panel 22 back to the main body portion 21 of the car audio apparatus, the procedure described above is carried out in the reverse sequence. The lock mechanism 24 also serves in cooperation with the CPU 3 as a sensor means that detects whether the front panel 22 is coupled to the main body portion 21. Therefore, it is possible to detect whether the front panel 22 is mounted to the main body portion 21 by sensing whether the lock mechanism 24 is locked.

The mechanism for attaching and detaching the front panel 22 to and from the main body portion 21 is not limited to the above example. Other means such as a mechanism using an electric motor or a magnetically locking mechanism may also be employed. The detection mechanism for sensing whether the front panel has been mounted to the main body portion can be replaced with other conventional detection means.

Figure 3:
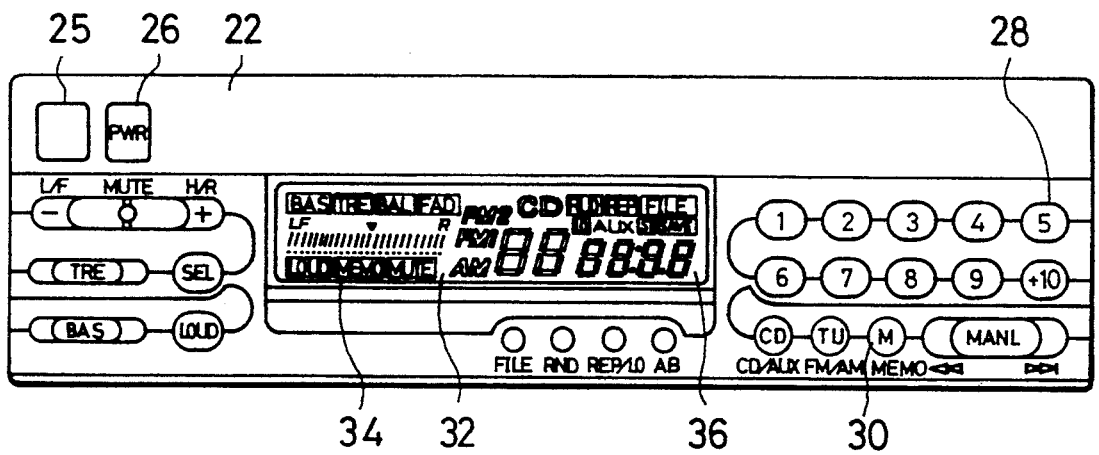
FIG. 3 is a front-view of the car audio apparatus shown in FIG. 2.

Referring next to FIG. 3, there is shown the front-view of the front panel of the car audio apparatus according to the invention. This audio apparatus has a radio receiver and a compact disk player (CD player). Instead, the audio apparatus may have a compact cassette tape recorder, audio equalizer, and other audio components. The front panel ejection button 25 is used when the front panel 22 should be detached from the main body portion. A main switch 26 permits the user to turn on or off a power supply of this car audio apparatus main body portion. Numerical keys which bear numerals 1 to 10, respectively, and are collectively indicated by 28 are used to preset desired broadcasting stations into the radio receiver and to selectively designate one of the music programs of a compact disc to be played back by the CD player. In the present embodiment, these numerical keys are also used to register a secret code. A code number registration key 30 is set to a secret registration mode where the car audio apparatus is capable of registering a secret code in the memories. A display unit 32 consists of light-emitting diodes, a liquid crystal or another kind of display. The display unit 32 includes a registration indicator 34. The secret code registration mode is indicated by lighting or flickering of this indicator 34. The display unit 32 further includes a numeral display portion 36 which displays two uppercase characters and four lowercase characters. Each character is composed of seven segments and thereby the display portion is capable of displaying the present time and the alphabet characters or the like. To facilitate the user's registration of a secret code as described later, the entered code can be displayed on this display portion 36 temporarily, i.e., only in the registration mode. Other switches provide conventional car audio functions and so they are not described herein.

Figure 4:
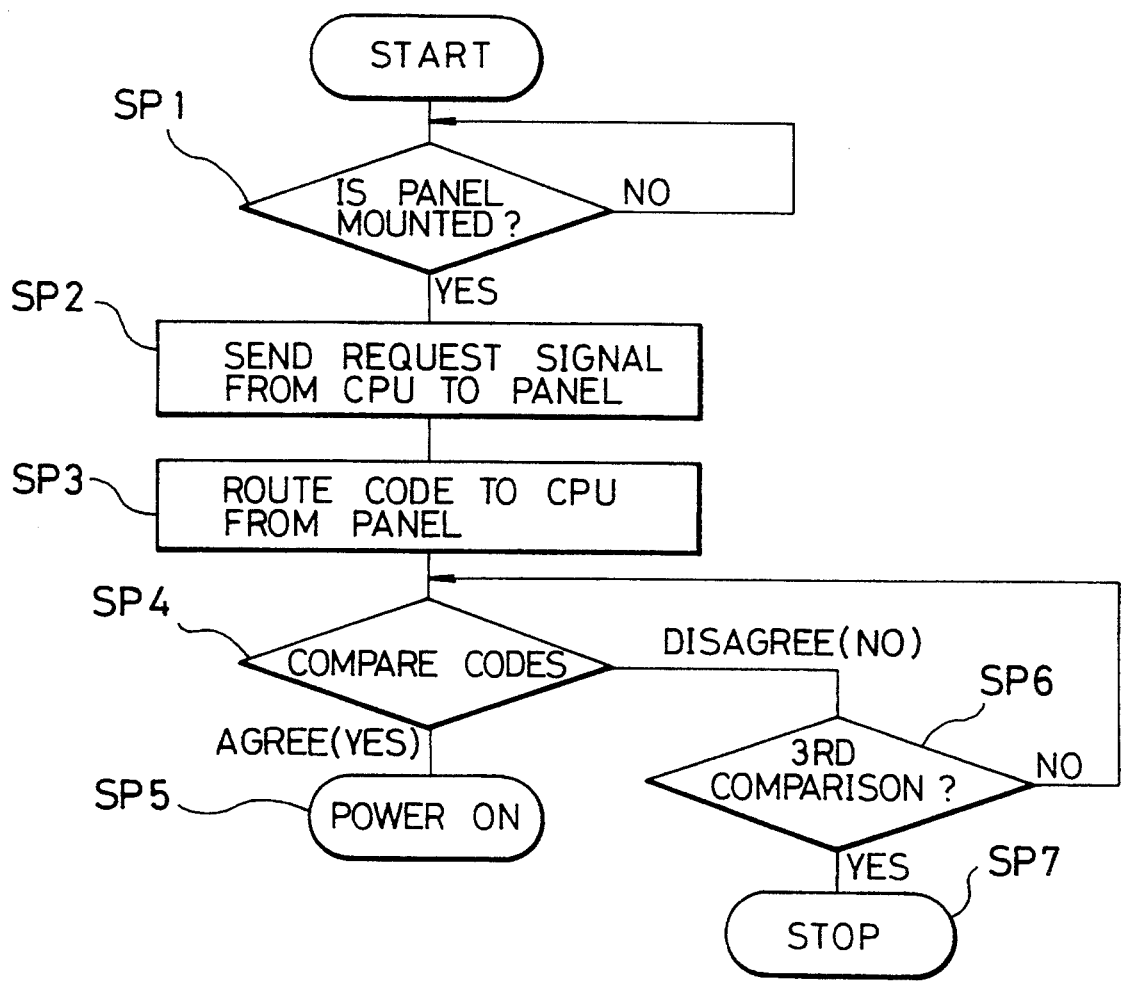
FIG. 4 is a flowchart illustrating a series of operations performed to register a secret code in the car audio apparatus according to the invention.

A series of operations performed to check if the entered code is the correct secret code is next described by referring to the flowchart of FIG. 4. First, a decision is made to determine whether the front panel 2 has been mounted to the main body portion 1 (step 1). This decision operation is repeated until a result of this decision is YES indicated by "Y", i.e., there is a state where the front panel 2 is mounted to the main body portion 1. If the result of the decision is YES, control proceeds to step 2, where a signal requesting reading the secret code from the memory 10 is sent to the reading control portion 11 from the CPU 3 via the I/O interface 5. In response to this signal, the reading control portion 11 reads the secret code from the memory 10 and supplies the read secret code to the CPU 3 via the I/O interface 5 (step 3). Then, the CPU 3 compares the secret code supplied from the front panel 2 with the secret code stored in the memory 6 of the main body portion 1 and makes a decision to ascertain whether they agree (step 4). If the result of this decision is YES, then control goes to step 5, where the main power supply of the main body portion is turned on, thus enabling operation of this audio apparatus.

If the result of the decision in step 4 is NO, then control goes to step 6, where a decision is made to see if the number of comparison operations has reached three times. If the result of the decision is NO, the decision in step 4 is again made. If the number of comparisons has reached three times, the result of the decision in step 6 is YES, at this time, the operation of the audio apparatus is stopped forcibly, and then the audio apparatus is disabled (step 7). The comparison can be repeated up to three times in the processing of step 6, because an erroneous transfer of the secret code might take place, thus leading to a misjudgment.

By virtue of the operations described above, the user is only required to install the front panel when the car audio apparatus is used. It is not necessary to enter the secret code. If the main body portion 1 is stolen and the thief installs another front panel of the same kind, the audio apparatus is disabled by the processing of steps 4, 6 and 7. Consequently, the thief is inhibited from using the main body portion subsequently.

Figure 5:
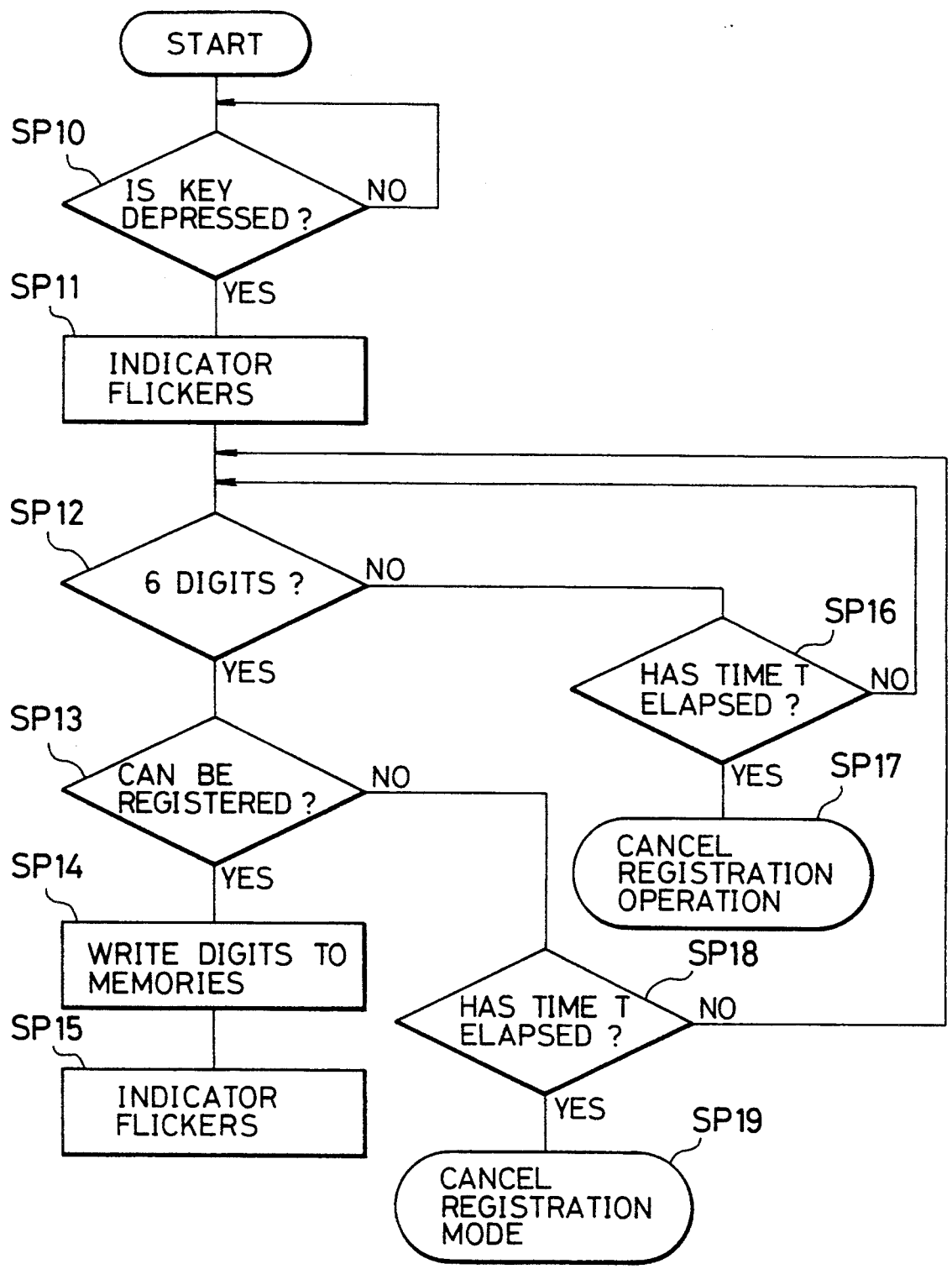
FIG. 5 is a flowchart illustrating a series of operations performed to make a decision to see if the code entered into the audio apparatus according to the invention is correct.

The case in which the secret code is altered by the user (owner), is now described. FIG. 5 is a flowchart illustrating a series of operations performed to register a secret code in the main body portion of the car audio apparatus and in the front panel. This code registration mode is permitted after steps 1 to 5 described above are carried out and thus the power supply of the main body portion of the car audio apparatus is turned on. Therefore, even if an alternative front panel is purchased, the power supply of the main body portion cannot be turned on.

A decision is made to see whether the code number registration key 30 shown in FIG. 3 has been depressed (step 10). If so, control goes to the next step. If not so, the registration mode is not established until the registration key 30 is depressed. The registration indicator 34 of the display unit 32 shown in FIG. 3 flickers, thus informing the operator that the car audio apparatus is presently in the registration mode (step 11). A decision is made to ascertain whether figures have been entered by operating the numerical keys (FIG. 3) (step 12) which are provided to register a secret code. For example, where the code consists of six figures (6 digits), whenever a digit is entered by depressing any one of the numerical keys 28, the entered digit is stored. In this way, six figures are entered in succession. Then, control proceeds to the next step. There is a possibility that the audio apparatus is in the registration mode against the operator's will. To prevent such inconvenience, if the time interval between the instant at which one digit is entered and the instant at which the next digit is entered is too long, the registration operation may be canceled. For this purpose, in this embodiment, the time elapsed after the registration key is depressed is counted by a counter or the like (step 16). If six figures are not yet entered when a given time T has elapsed, then the registration operation is canceled (step 17). Assuming that six figures have been entered, a decision is made to see if the entered figures can be registered as a secret code (step 13). That is, whether they can be stored as two-valued data in the memory of the main body portion and in the memory of the front panel depends on whether the registration key has been again depressed. If the registration key is depressed, the entered figures are registered as a new secret code. As in step 12, a decision is made to see if the registration key is not yet depressed when the given time T has elapsed since the sixth digit has been entered (step 18). If the key is not depressed, the registration mode is canceled (step 19). The temporarily stored figures are written to the memories of the main body portion and of the front panel in response to the depression of the registration key (step 14). These figures are retained in the memories unless the code is altered by the procedure described above. To inform the operator that the figures have been registered, the registration indicator 34 of the display portion is made to flicker (step 15).

As described thus far, in accordance with the present invention, security against theft is given by taking only the front panel out of the vehicle. Therefore, it is not necessary to take out the heavy audio apparatus and so inconvenience is prevented. Also, it is not necessary to enter the secret code each time the audio apparatus is used. Furthermore, if the main body portion of the audio apparatus is stolen and a new front panel of the same type is purchased, the use of the main body portion of the car audio apparatus is disabled.

What is claimed is:

1. A car audio apparatus mounted on an automobile comprising:
   a main body portion fixed to the automobile, the main body portion having a first storage means for storing a first secret code;
   a front panel detachably mounted to the main body portion of the audio apparatus, the front panel having a second storage means for storing a second secret code; and
   a control means for respectively reading out the first and second secret codes from the first storage means and second storage means and comparing the first secret code with the second secret code so that when both secret codes agree, the control means enables the operation of the car audio apparatus and when both of the secret codes do not agree, the control means inhibits the operation of the car audio apparatus.

2. A car audio apparatus according to claim 1, wherein the front panel forms an operation panel for designating a desired operation of the car audio apparatus.

3. A car audio apparatus according to claim 1, wherein the front panel further comprises input means for inputting a plurality of codes so that the first and second storage means respectively store a code inputted by the input means as new first and second secret codes.

* * * * *